United States Patent [19]

Vuillaume

[11] Patent Number: 5,396,689
[45] Date of Patent: Mar. 14, 1995

[54] PROCESS FOR OBTAINING A COMPOSITE TEXTILE STRUCTURE BASED ON NONWOVEN FIBROUS SHEETS

[75] Inventor: André Vuillaume, Biviers, France
[73] Assignee: Perfojet SA, France
[21] Appl. No.: 191,713
[22] Filed: Feb. 4, 1994

Related U.S. Application Data

[63] Continuation of Ser. No. 997,940, Dec. 29, 1992, abandoned.

[30] Foreign Application Priority Data

Jan. 28, 1992 [FR] France ............... 92 01143

[51] Int. Cl.6 ........................... D04H 5/02
[52] U.S. Cl. .......................... 28/103; 28/104
[58] Field of Search ............... 28/103, 104, 105, 107, 28/116, 158, 167; 428/284, 294, 299

[56] References Cited

U.S. PATENT DOCUMENTS

| | | | |
|---|---|---|---|
| 492,885 | 6/1890 | Childs | 428/294 |
| 1,885,280 | 11/1932 | Moore | 428/294 |
| 2,588,228 | 3/1952 | Gates . | |
| 3,047,444 | 7/1962 | Harwood | 28/104 |
| 3,401,467 | 9/1968 | Koester | 28/116 |
| 3,551,265 | 12/1970 | Jackson | 28/104 |
| 4,145,468 | 3/1979 | Mizoguchi et al. | 28/104 |
| 4,170,676 | 10/1979 | Thomas | 428/113 |
| 4,284,680 | 8/1981 | Awano et al. | 28/103 |
| 4,560,603 | 12/1985 | Giacomel | 428/294 |
| 4,647,492 | 3/1987 | Grant et al. | 428/294 |
| 4,798,760 | 1/1989 | Diaz-Koth | 28/107 |
| 4,808,467 | 2/1989 | Suskind et al. | 28/105 |
| 4,830,915 | 5/1989 | Diaz-Kotti | 28/107 |
| 4,858,547 | 8/1989 | Sternlieb | 428/294 |
| 5,153,056 | 10/1992 | Groshens | 28/108 |

FOREIGN PATENT DOCUMENTS

| | | | |
|---|---|---|---|
| 2292793 | 6/1976 | France . | |
| 1919816 | 1/1970 | Germany . | |
| 2348303 | 9/1973 | Germany | 28/107 |
| 2828394 | 1/1979 | Germany . | |
| 1600768 | 10/1981 | United Kingdom . | |
| WO89/03445 | 4/1989 | WIPO . | |

Primary Examiner—Clifford D. Crowder
Assistant Examiner—Amy B. Vanatta
Attorney, Agent, or Firm—Parkhurst, Wendel & Rossi

[57] ABSTRACT

A process for obtaining a multilayer composite textile structure containing nonwoven fibrous sheets (2, 3) between which is incorporated a reinforcing structure consisting of continuous yarns or filaments (5), the various constituents being bonded together by mutual entanglement of the fibers of the sheets. According to the invention, two nonwoven sheets (2, 3) are produced in which the elementary fibers are arranged preferentially in the length direction. Between these two sheets (2, 3) there is incorporated a sheet (4) of weft yarns (5) which are arranged transversely, at a distance from each other. The sheet (4) of weft yarns is produced immediately upstream of the line of junction (6) between the two nonwoven sheets (2, 3), and downstream of this zone of junction (6) the composite formed is subjected to the action of a mechanical treatment which makes it possible to implant the fibers of one sheet (2) within the other sheet (3) (and optionally vice versa). The homogeneous composite is then reeled up.

3 Claims, 2 Drawing Sheets

PROCESS FOR OBTAINING A COMPOSITE TEXTILE STRUCTURE BASED ON NONWOVEN FIBROUS SHEETS

This is a continuation of application Ser. No. 07/997,940, filed Dec. 29, 1992, now abandoned.

BACKGROUND OF THE INVENTION

The present invention relates to a process and an apparatus which make it possible to produce a new type of composite textile structure from nonwoven fibrous sheets.

It has been proposed for decades to replace woven or knitted conventional textile sheets with so-called "nonwoven" planar textile structures consisting of elementary fibers distributed substantially in the same plane and oriented randomly in relation to each other. It is possible for such sheets to be obtained by two major general techniques, one called "dry-route technique" making use of carding, napping and similar operations, and the other called "by wet route", and derived from papermaking techniques.

It has also been proposed to produce such nonwoven sheets directly from continuous chemical filaments, as they leave their extrusion die, such a technique being nowadays commonly referred to by the expression "spun bonded".

Such elementary nonwoven sheets are often converted into more complex structures as a function of the envisaged applications, as can be seen especially from GB-A-1,600,768 and U.S. Pat. No. 2,588,228. In general, when it is desired to obtain articles exhibiting good mechanical strength both in the longitudinal direction and in the transverse direction, multilayer structures are produced into which are sandwiched reinforcing structures such as woven or nonwoven textile grids. The bonding of the reinforcing member with the nonwoven outer layers is obtained by various techniques such as, for example, mechanical interlacing (needling technique), entangling of the fibers by the action of fluid Jets (generally water), chemical bonding or heat bonding (calendering) when the elementary nonwoven sheets contain thermofusible fibers.

In the case of the nonwoven sheets obtained by a papermaking route, it has also been proposed for a long time to combine them with reinforcing structures. Such reinforcing structures may either be incorporated directly into the papermaking pulp during the manufacture or optionally incorporated between two previously produced nonwoven sheets, the bonding being in this latter case generally obtained by adhesive bonding.

In general, the techniques proposed hitherto for producing such composite structures comprising an internal reinforcement make use of a noncontinuous manufacturing cycle (separate formation of nonwoven sheets and of the reinforcement, such as grids), the assembly being carried out during a subsequent operation, and this undoubtedly increases the cost of manufacture and presents problems of storage of the elementary materials.

SUMMARY OF THE INVENTION

There has now been found, and it is this that forms the subject of the present invention, a process and an apparatus which it possible to produce continuously such multilayer textile structures consisting of nonwoven fibrous sheets and between which a reinforcing structure consisting of a continuous filament (or filaments) is incorporated, and in which the various constituents are bonded together by mutual entanglement of the fibers of the sheets. Furthermore, the process and apparatus of the present invention also make it possible, by an appropriate selection of the choice of the nature of the fibrous sheets forming part of the composition of such a composite and of the entangling technique employed, when the reinforcing structure consists of parallel yarns lying only in the transverse direction, to obtain an improvement in the mechanical characteristics of the composite also in the longitudinal direction.

In general, the process and the apparatus in accordance with the invention for the production of such a multilayer composite textile structure is characterized in that two nonwoven sheets are produced in which the elementary fibers are arranged preferably in the direction of their length, in that there is then incorporated between these two sheets a sheet of weft yarns arranged transversely and spaced apart from each other, which sheet is produced immediately upstream of the line of junction between the two nonwoven sheets and in that, downstream of this zone of junction, the composite formed is subjected to at least one mechanical treatment which makes it possible to implant the fibers of one sheet within the other sheet (and optionally vice versa), the homogenous composite thus produced being subsequently reeled up.

According to a preferred embodiment of the process in accordance with the invention, the length of the noncontinuous fibers which form the nonwoven fibrous sheets is such that it is greater than the spacing between the transverse yarns forming the internal reinforcement.

Furthermore, the mechanical treatment which makes it possible to implant the fibers of one sheet within the other sheet is preferably a mechanical needling treatment produced by the so-called technique using "water jets", optionally in combination with a heat-bonding operation.

In order to implement the process in accordance with the invention, nonwoven sheets obtained by carding at high speed will be advantageously employed. In fact, it has been found that the choice of such sheets in which there is a preferential orientation of the fibers in the direction of the length of the web formed makes it possible, insofar as the transverse reinforcing yarns are arranged inside the composite so as to have a spacing between them which is smaller than the length of the fibers which form the web, to obtain not only an improved strength of the material in the transverse direction, but also a locking and an improvement in the strength of the composite in the longitudinal, said strengths being appreciably balanced. Such a result is totally unexpected, bearing in mind the fact that it is commonplace to find nonwoven sheets which have a longitudinal and a transverse direction strength ratio of 5 to 1, in some cases of 8 to 1 or more. In addition, this strength in the transverse direction is coupled with a considerable elongation, which is reflected in an absence of dimensional stability rendering the nonwoven sheets unsuitable for applications such as, for example, single-use garments. Now, the material obtained by virtue of the process in accordance with the invention allows this problem to be solved by the fact that the composite formed exhibits, as already said, not only an improved strength in the transverse direction, which is obvious from the fact of the incorporation of reinforcements in this direction, but also in the longitudinal, and this, in contrast, cannot in any event stem from the prior art.

The process in accordance with the invention makes it possible to produce a very large number of different composites, this being merely by the choice of the nonwoven sheets, which may consist, for example:
- of two carding webs,
- of a carding web and a sheet based on cellulose fibers,
- of a carding web and a nonwoven web obtained by extrusion/blowing (technique known as "melt blown");
- of two webs obtained by extrusion/blowing;
- of a web of fibers combined with a nonwoven sheet consisting of continuous filaments (obtained by the "spun bonded" technique;
- or even of two webs consisting of continuous filaments; in such a case, the preferential condition of implementation of the process according to the invention, according to which the spacing between the reinforcing wefts must be smaller than the length of the fibers, is necessarily fulfilled.

BRIEF DESCRIPTION OF THE DRAWINGS

The invention and the advantages which it contributes will be better understood by virtue of the remainder of the description which follows and of the attached figures, in which.

DETAILED DESCRIPTION OF THE INVENTION

Figure 1:
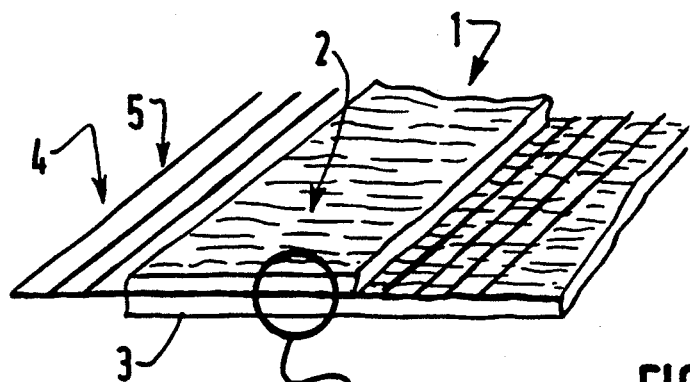
FIG. 1 illustrates, diagrammatically and in perspective, the general structure of a composite material produced in accordance with the invention.
Figure 2:
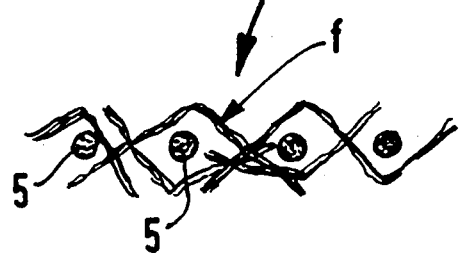
FIG. 2 is a diagrammatic enlarged view of the circled part of FIG. 1, showing the structure of such a material in section.

If reference is made to the attached figures and more particularly to FIGS. 1 and 2, the composite textile structure produced in accordance with the invention and denoted by the general reference (1) consists of two nonwoven sheets (2, 3) between which is incorporated a reinforcing structure (4) consisting of continuous yarns or filaments (5).

According to the invention, in such a multilayer composite structure at least one of the sheets (2, 3) forming part of its composition is based on noncontinuous fibers preferably oriented in the length direction of the sheet, such as, for example, carding webs. The length of the fibers is such that it is greater than the spacing between the transverse yarns (5) forming the internal reinforcement (4). The mutual bonding of the nonwoven sheets (2, 3) is produced by subjecting the composite to a mechanical consolidating treatment by needling by means of water jets. When such a procedure was followed it was found that a structure was obtained which, viewed in section, appeared diagrammatically as illustrated in FIG. 2, and which is such that the elementary fibers (f) of the sheets form, at each point of contact between the said fibers (f) and the continuous filaments (5), an anchoring zone promoting the entanglement of the fibers and reducing their ability to slide, which makes it possible to increase the strength of the product significantly in the longitudinal direction.

Figure 3:
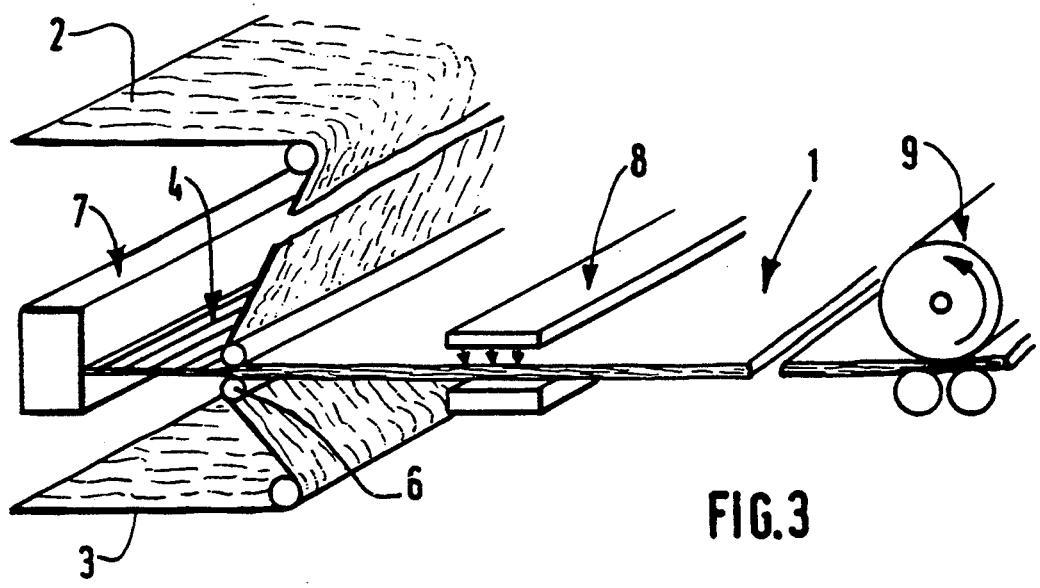
FIG. 3 is a diagrammatic perspective view of an apparatus which makes it possible to implement the process in accordance with the invention.
Figure 4:
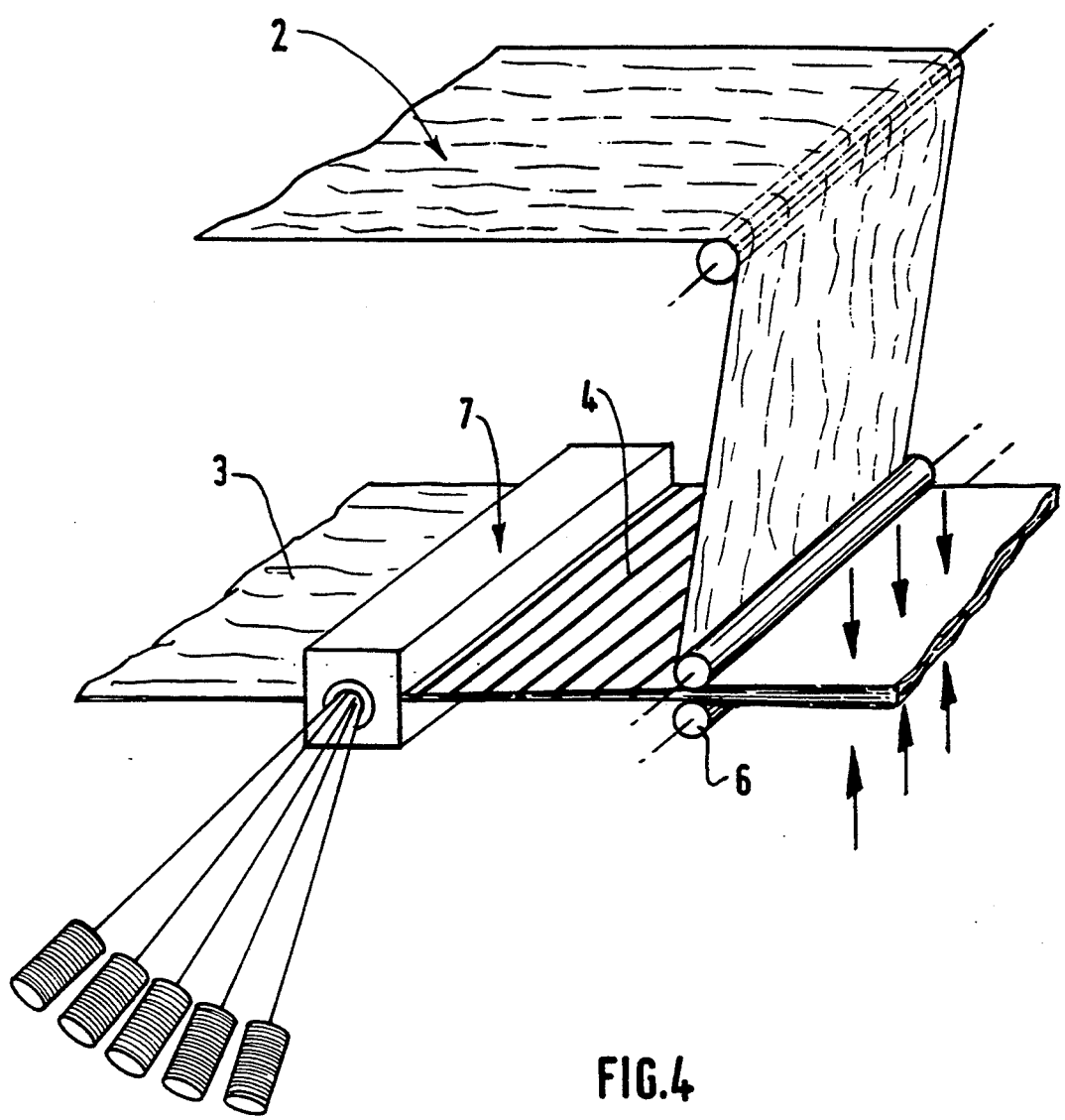
FIG. 4 illustrates, also seen in perspective, an alternative form of a machine in accordance with the invention.

To produce such a composite, the procedure is as illustrated in FIGS. 3 and 4 in order to produce continuously the reinforcing weft sheet (4) and to incorporate it between two nonwoven sheets (2, 3) and to assemble the layers together. To do this, the two sheets (2, 3) either produced beforehand or originating directly from a carder or another production apparatus which is not shown, are delivered separately to a joining unit (6) consisting, for example, of sheet rolls. Upstream of this zone of junction a unit (7), of known type, is arranged, making it possible to produce woven sheets. By way of guidance, this unit (7) which makes it possible to produce such woven sheets (4) at high speed, may employ an apparatus such as those forming the subject of patent WO 89/03,445. Of course, any other apparatus for forming equivalent weft sheets making possible production at high speed could be employed. Downstream of the joining unit (6) the composite formed is subjected to the action of a bonding unit which makes it possible to implant the fibers of the sheets within another sheet, for example the fibers of sheet (2) within sheet (3). Such a bonding unit (8) consists advantageously of a mechanical needling unit and preferably a water jet unit, for example an apparatus of the type marketed by the assignee of the present application, under reference JETLACE. A needling operation is preferably carried out on both faces of the composite. On leaving the bonding unit (8) the composite (1) is reeled up at (9).

While, in the embodiment illustrated in FIG. 3, both elementary sheets (2, 3) are delivered simultaneously to the bonding unit (6) by passing on either side of the head (7) for forming the woven sheet (4), it could be envisaged to make one of the sheets (for example (3)) pass inside the unit (7), making it possible to produce the woven sheet (4). Such a procedure makes it possible to ensure the support of the wefts before they are trapped between the second fibrous sheet (2) in the zone (6).

By proceeding in this way, employing as a weaving unit a device like that described in Patent WO 89/03,455, it has been possible to produce composites from carding sheets of polyester fibers weighing 20 g/m$^2$ (length of each fiber: 38 mm; 1.7 dtex) with a production speed of 40 m/min. The insertion of the wefts is carried out with a spacing of one centimeter between each yarn (5), the yarn (5) consisting of 76 dtex/34 polyester yarns.

After consolidation treatment in (8), a composite is obtained which not only exhibits a very high strength in the weft direction and whose elongation in the same direction is decreased, and which therefore has a reinforced dimensional stability. It has also been found that the strength in the longitudinal is also reinforced, and this makes it possible to obtain an article which has long and wide characteristics which are balanced overall and which is particularly suitable for the production, for example, of disposable articles of clothing.

Proceeding in this way also makes it possible to assemble together nonwoven sheets obtained by the so-called "wet route" technique, such sheets also exhibiting the characteristic of having fibers oriented preferentially over their length. By way of guidance, it is possible, using an apparatus of the type as illustrated in Figure 3, to produce a composite exhibiting very good mechanical characteristics both in the longitudinal and in the transverse direction by assembling two nonwoven sheets produced beforehand weighing 25 g/m$^2$ and consisting of 60% of cellulose fibers and 40% of 12 mm, 1.7 dtex polyester fibers, and between which are incorporated wefts spaced 6 mm apart, the speed of production of the whole being set at 30 m/min.

After treatment with a fluid jet, a composite is also obtained exhibiting an improved strength both across and in length compared with a nonwoven sheet and especially a high dimensional stability in both directions.

Of course, the invention is not limited to the examples of embodiments described above, but it covers all their alternative forms produced in the same spirit.

I claim:

1. A process for continuously producing a multilayer composite textile structure having a longitudinal dimension and a weft dimension, comprising the steps of:

providing a continuous supply of first and second nonwoven fibrous sheets, the elementary fibers of which are arranged substantially lying in the longitudinal direction of the textile structure;

forming and continuously supplying a reinforcing sheet consisting of continuous yarns or filaments each extending only in the weft direction of the textile structure, said yarns or filaments being spaced from one another by a distance smaller than a length of the elementary fibers of each nonwoven fibrous sheet;

providing junction means downstream from the continuous supply of nonwoven fibrous sheets and immediately downstream from the continuous supply of reinforcing sheet, to sandwich said reinforcing sheet between said first and second nonwoven fibrous sheets; and bonding said first and second nonwoven fibrous sheets together through said reinforcing sheet by subjecting said nonwoven fibrous sheets to a treatment which forces portions of fibers in said first and second nonwoven fibrous sheets to extend through said reinforcing sheet and implant in said second and first nonwoven fibrous sheets, respectively.

2. The process of claim 1, wherein the treatment comprises applying water jets to the nonwoven fibrous sheets to needle the fibers thereof together.

3. The process of claim 2, wherein the treatment further comprises a heat bonding operation.

* * * * *